US 8,447,855 B2

(12) United States Patent
Chesla

(10) Patent No.: US 8,447,855 B2
(45) Date of Patent: May 21, 2013

(54) METHOD, SYSTEM AND COMPUTER PROGRAM PRODUCT FOR PREVENTING SIP ATTACKS

(75) Inventor: Avi Chesla, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 1029 days.

(21) Appl. No.: 11/835,503

(22) Filed: Aug. 8, 2007

(65) Prior Publication Data

US 2009/0043724 A1  Feb. 12, 2009

(51) Int. Cl.
*G06F 7/00* (2006.01)

(52) U.S. Cl.
USPC .......................................... 709/225; 709/224

(58) Field of Classification Search
USPC ................................. 709/223–226
See application file for complete search history.

(56) References Cited

U.S. PATENT DOCUMENTS

| 2003/0043740 | A1* | 3/2003 | March et al. ................. 370/229 |
| 2004/0250124 | A1* | 12/2004 | Chesla et al. ................ 713/201 |
| 2005/0234920 | A1* | 10/2005 | Rhodes ........................... 707/10 |
| 2006/0142037 | A1* | 6/2006 | Sung et al. ..................... 455/518 |
| 2008/0127349 | A1* | 5/2008 | Ormazabal et al. ............. 726/25 |

* cited by examiner

*Primary Examiner* — Ian N Moore
*Assistant Examiner* — Thai Nguyen
(74) *Attorney, Agent, or Firm* — Myers Wolin, LLC

(57) ABSTRACT

A method for preventing session initiation protocol (SIP) attacks is provided. The method includes receiving a plurality of SIP response messages comprising at least one pre-defined SIP response code, and extracting at least one user identifier from the plurality of SIP response messages. The method further includes computing at least one of a frequency of the plurality of SIP response messages and a count of the plurality of SIP response messages corresponding to each user identifier of the at least one user identifier. The method further includes calculating a degree of attack corresponding to each user identifier using at least one of the frequency and the count. The method further includes determining a monitoring interval for each user identifier based upon the degree of attack for monitoring the plurality of SIP response messages. An apparatus and a computer program product for preventing SIP attacks are also provided.

30 Claims, 5 Drawing Sheets

METHOD, SYSTEM AND COMPUTER PROGRAM PRODUCT FOR PREVENTING SIP ATTACKS

FIELD OF THE INVENTION

The present invention relates in general to network security, and more particularly, to preventing session initiation protocol (SIP) attacks.

BACKGROUND

Voice over internet protocol (VoIP) service is becoming popular due to advanced telephony features provided by the VoIP service and its cost effectiveness. Session initiation protocol (SIP) is emerging as a de-facto standard for a signaling control protocol to establish a VoIP session. However, the SIP protocol is vulnerable against various SIP application attacks. The SIP application attacks may be classified as signature based attacks and non-signature based attacks. The signature based attacks exploit known vulnerability of the SIP protocol. Every signature based attack includes an attack signature that describes a pattern of a known security violation. For example, a SIP non-American standard code for information exchange (ASCII) attack is characterized by presence of non-ASCII characters within a 'Call-ID' header field of the SIP messages. The non-signature based attacks employ a sequence of legitimate and malignant SIP messages to create a partial or a full denial of service (DoS) condition. Besides DoS attacks, the legitimate malignant activities also include SIP brute-force attacks and scanning attacks that automatically send different types of SIP messages over a relatively short time. Through the scanning attacks, an attacker may expose information, such as, but not limited to, a SIP server's application information, user information, and registered users. This may lead to unauthorized use of resources of the SIP server, fraud, SPAM over internet telephony (SPIT), call redirection, and exploitation of known SIP vulnerabilities.

Many existing solutions for preventing SIP attacks analyze the SIP messages for detecting attack signatures of known signature based attacks to predict a possible attack. A major disadvantage with these solutions is their inability to prevent zero-day attacks. Furthermore, the signatures need to be updated to mitigate any new signature based attacks.

Some of the techniques to protect SIP servers against non-signature based attacks monitor SIP message traffic at various ports of a protected SIP server. These techniques predict an attack when an anomaly in the SIP message traffic is detected. To prevent the attack, an attacked port of the protected SIP server is disabled, thereby blocking any SIP message traffic through the attacked port. However, this leads to blocking of legitimate users as well.

Furthermore, one or more of the above-mentioned techniques need human intervention to decide whether an attack is in progress. This reduces response time against the attack and creates the partial or full DoS condition in an intervening interval.

Therefore, there is a need in the art for a protection scheme that provides protection against SIP attacks without a need for any human intervention or an update of the attack signatures while allowing SIP message traffic for legitimate users.

SUMMARY

A method for preventing session initiation protocol (SIP) attacks is provided. The method includes receiving a plurality of SIP response messages comprising at least one pre-defined SIP response code, and extracting at least one user identifier from the plurality of SIP response messages. The method further includes computing at least one of a frequency of the plurality of SIP response messages and a count of the plurality of SIP response messages corresponding to each user identifier of the at least one user identifier. The method further includes calculating a degree of attack corresponding to each user identifier using at least one of the frequency and the count. The method further includes determining a monitoring interval for each user identifier based upon the degree of attack for monitoring the plurality of SIP response messages.

An apparatus for preventing SIP attacks is also provided. The apparatus includes a receiving module for receiving a plurality of SIP response messages comprising at least one pre-defined SIP response code, and an extractor for extracting at least one user identifier from the plurality of SIP response messages. The apparatus further includes one or more computation modules for computing at least one of a frequency of the plurality of SIP response messages and a count of the plurality of SIP response messages corresponding to each user identifier of the at least one user identifier. The apparatus further includes a prediction module for calculating a degree of attack corresponding to each user identifier using at least one of the frequency and the count. The apparatus further includes a timer module for determining a monitoring interval for each user identifier based upon the degree of attack for monitoring the plurality of SIP response messages.

A computer program product for preventing SIP attacks is also provided. The computer program product includes computer usable program code for receiving a plurality of SIP response messages comprising at least one pre-defined SIP response code and computer usable program code for extracting at least one user identifier from the plurality of SIP response messages. The computer program product further includes computer usable program code for computing at least one of a frequency of the plurality of SIP response messages and a count of the plurality of SIP response messages, corresponding to each user identifier of the at least one user identifier. The computer program product further includes computer usable program code for calculating a degree of attack corresponding to each user identifier using at least one of the frequency and the count. The computer program product further includes computer usable program code for determining a monitoring interval for each user identifier based upon the degree of attack for monitoring the plurality of SIP response messages.

DETAILED DESCRIPTION

Figure 1A:
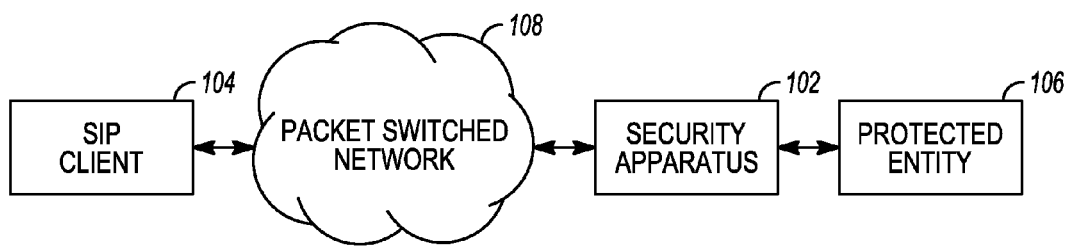
FIG. 1A illustrates a system for deploying a security apparatus for preventing session initiation protocol (SIP) attacks, in accordance with an embodiment of the present invention.

FIG. 1A illustrates a system 100 for deploying a security apparatus 102 for preventing session initiation protocol (SIP) attacks, in accordance with an embodiment of the present invention. The system 100 includes at least one SIP client 104, a protected entity 106 and a packet-switched network 108.

The security apparatus 102 monitors one or more SIP messages exchanged between the SIP client 104 and the protected entity 106. The security apparatus 102 protects the protected entity 106 against different types of SIP attacks. The different types of SIP attacks include known SIP attacks as well as unknown SIP attacks. For example, the SIP attacks include, but are not limited to, SIP brute-force attacks, SIP dictionary attacks, SIP application scans, spoofed SIP Invite floods, spoofed SIP Register floods, scanning activities for spam over internet protocol telephony (SPIT), and zero-day attacks. A detailed implementation of the security apparatus 102 is described in conjunction with FIG. 2.

The SIP client 104 may be a SIP-capable phone, an analog telephone together with an analog telephone adaptor (ATA), or a personal computer (PC) capable of establishing a SIP connection. The protected entity 106 may be a SIP proxy server, SIP redirect server, a SIP registration server, or a SIP client. The security apparatus 102 may also protect more than one entity at the same time, for example, the security apparatus 102 may protect a SIP proxy server and a SIP redirect server.

The one or more SIP messages exchanged between the SIP client 104 and the protected entity 106 to establish a voice over Internet protocol (VoIP) session, pass through the packet switched network 108. The one or more SIP messages may be carried either over user datagram protocol (UDP) or over transmission control protocol (TCP). The packet switched network 108 is based on a packet switched protocol, such as Internet protocol (IP). The packet switched network 108 may be a local area network (LAN), a wide area network (WAN), a campus area network (CAN), a metropolitan area network (MAN), or the Internet. The packet switched network 108 may also be a combination of more than one type of network, for example, the packet switched network 108 may be a combination of a LAN and the Internet. A person skilled in the art will also recognize that the packet switched network 108 may also include one or more network elements such as, but not limited to, a SIP proxy server, a SIP redirect server, a SIP registration server, a router, or a combination thereof, for routing the SIP messages between the SIP client 104 and the protected entity 106.

Figure 1B:
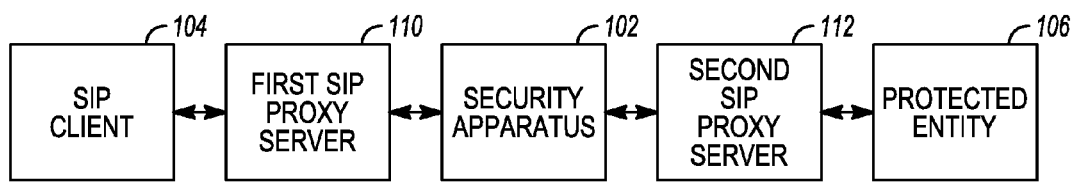
FIG. 1B illustrates a system for deploying a security apparatus for preventing session initiation protocol (SIP) attacks, in accordance with another embodiment of the present invention.

In another exemplary implementation, the security apparatus 102 may also be deployed between the one or more network elements. An embodiment of such a deployment of the security apparatus 102 is illustrated in FIG. 1B. In this case, the security apparatus 102 is connected between a first SIP proxy server 110 and a second SIP proxy server 112. The SIP messages exchanged between the security apparatus 102 and the protected entity 106 are routed through the second SIP proxy server 112.

Figure 2:
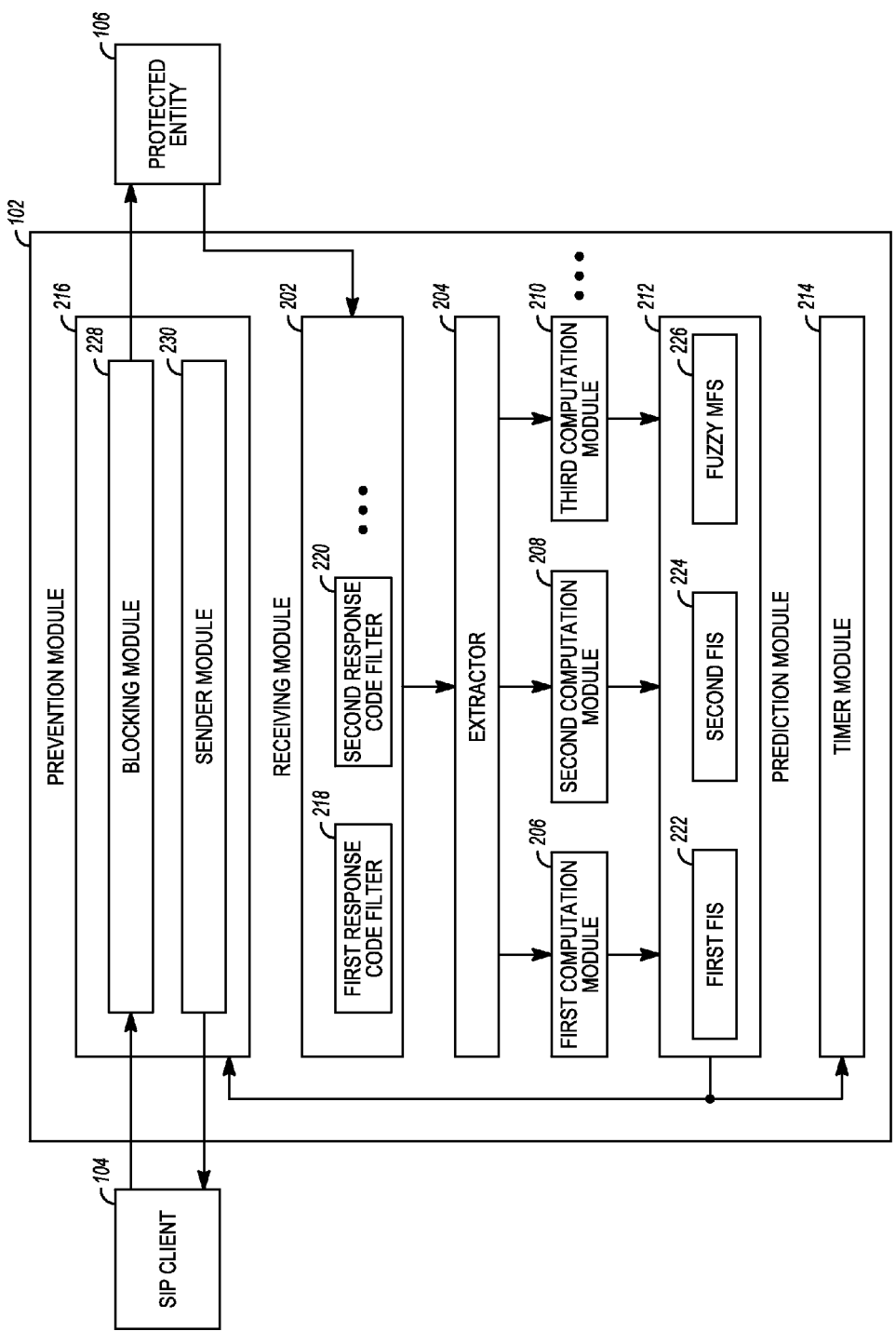
FIG. 2 illustrates a schematic diagram of a security apparatus for preventing SIP attacks, in accordance with an embodiment of the present invention.

FIG. 2 illustrates a schematic diagram of the security apparatus 102 for preventing SIP attacks, in accordance with an embodiment of the present invention. The apparatus 102 includes a receiving module 202, an extractor 204, one or more computation modules 206, 208, 210, a prediction module 212, a timer module 214, and a prevention module 216. The packet switched network 108 is not shown in FIG. 2 for reasons of clarity.

The receiving module 202 receives a plurality of SIP response messages from the protected entity 106. The receiving module 202 filters the plurality of SIP response messages to determine whether the plurality of SIP response messages includes at least one pre-defined SIP response code. The pre-defined SIP response codes may be selected from a plurality of SIP error response codes. The pre-defined SIP response codes include SIP error response codes such as, but not limited to, 400, 401, 403, 407, 413, 416, and 483. The pre-defined SIP response codes may be selected depending upon the type of SIP attacks. For example, if the security apparatus 102 is configured to prevent SIP brute force attacks, the pre-defined SIP response codes may include SIP error response codes 401 and 407. In another exemplary case, the pre-defined SIP response codes include a SIP error response code 404 for protecting against scanning activity before a possible spam over internet telephony (SPIT) attack. A person skilled in the art will recognize that additional SIP error response codes may be included in the pre-defined SIP response codes for protection against other types of SIP attacks.

The receiving module 202 may include one or more response code filters 218 and 220 corresponding to each of the pre-defined SIP response codes for filtering the plurality of SIP response messages. The one or more response code filters are designed to trace different types of attack behaviors. For example, the first response code filter 218 may be designed to trace SIP brute-force attacks, whereas the second respond code filter 220 may be designed to trace SIP spoofed INVITE flood.

The extractor 204 extracts at least one user identifier from at least one SIP response message of the plurality of SIP response messages, when the receiving module 202 determines that the at least one SIP response message includes one of the pre-defined SIP response codes. The at least one user identifier identifies a user for whom the at least one SIP response message is intended. The at least one user identifier may be either a SIP uniform resource indicator (URI), or an internet protocol (IP) address of the user, or both. A person skilled in the art will recognize that the security apparatus 102 may use a SIPs URI instead of the SIP URI. The extractor 204 extracts the at least one user identifier from a "From" header field of the at least one SIP response message. The extractor 204 may also use a "Contact" header field or a "Via" header field of the at least one SIP response message to extract the at least one user identifier. Alternatively, the extractor 204 may also be configured to extract the at least one user identifier from more than one header fields. Receipt of the at least one SIP response messages at the receiving module 202 is, hereinafter, referred to as a negative event corresponding to the at least one user identifier extracted from the at least one SIP response message.

The one or more computational modules 206, 208, and 210 compute a frequency of the plurality of SIP response messages, or a count of the plurality of SIP response messages, or both for each user identifier. In other words, the computational modules 206, 208, and 210 compute at least one of the frequency or the count of negative events for each user identifier. A separate computation module is used for each user identifier. For example, the first computation module 206 may be used for a SIP URI abc@example.com and the second computation module 208 may be used for the IP address 111.222.111.222. Furthermore, the third computation module 210 may be used for a SIP URI xyz@test.com. After an occurrence of every negative event corresponding to the at least one user identifier, an associated computation module computes the frequency and the count of the negative events for the at least one user identifier. That is, if the negative event corresponds to the SIP URI abc@example.com, the first computation module 206 computes the frequency and the count of negative event. A detailed implementation of the one or more computation modules 206, 208, and 210 is explained in conjunction with FIG. 3.

The computation modules 206, 208 and 210 then pass the computed frequency and the computed count to the prediction module 212. In addition, the computation modules 206, 208 and 210 also pass a sensitivity parameter to the prediction module 212. The sensitivity parameter indicates sensitivity of the security apparatus 102 to detect a possible attack from an attacker. The sensitivity parameter is configurable and is configured by an administrator. In an exemplary implementation, the sensitivity parameter takes four different values: High, Medium, Low, and Minor. As the values suggest, the 'High' value denotes that the security apparatus 102 is most sensitive to detect the possible attack, whereas if the sensitivity parameter takes the value "Minor", the security apparatus is least sensitive to detect the possible attack. In one example, the sensitivity parameter is set to "Medium" as default. Furthermore, the sensitivity parameter may also be configured separately for each user identifier based on a particular user identifier. For example, as the IP address may represent more than one SIP users, the sensitivity parameter for the IP address is set lower than the sensitivity parameter for the SIP URI to reduce false attack detections.

The prediction module 212 calculates a degree of attack for each user identifier using the computed frequency and the computed count. In one exemplary case, the degree of attack takes values between 2 and 10. In another exemplary case, the degree of attack may range from 0% to 100%. Calculation of the degree of attack is also based upon the sensitivity parameter as explained later. The prediction module 212 includes one or more fuzzy logic inference systems (FIS) 222 and 224 for each user identifier. For example, a first FIS 222 calculates the degree of attack for the SIP URI, whereas a second FIS 224 calculates the degree of attack for the IP address. Each FIS has at least two inputs, the computed frequency and the computed count. However, each FIS is not limited to two inputs. The prediction module 212 further includes one or more fuzzy logic membership functions (MFs) 226 corresponding to the SIP URI and the IP address. For each of the SIP URI and the IP address, there are an input MF for the frequency and a second input MF for the count. The one or more MFs 226 include four sets of membership functions, with each set corresponding to different values of the sensitivity parameter. In an exemplary implementation, each membership function includes one or more trapezoids associated with one or more states of attack for each user identifier.

Furthermore, the prediction module 212 determines a state of attack corresponding to each user identifier based on the degree of attack. In an exemplary case, the prediction module 212 implements three states of attack, namely 'normal state', 'suspect state', and 'attack state'. The 'attack state' is set, if the degree of attack is greater than a first threshold. The 'suspect state' is set, if the degree of attack is between the first threshold and a second threshold, where the second threshold is smaller than the first threshold. The prediction module 212 predicts the 'normal state' if the degree of attack is smaller than the second threshold. In an exemplary implementation, the first threshold and the second threshold are set to 8 and 5, respectively, when the degree of attack ranges between 2 and 10.

The timer module 214 determines a monitoring interval for each of the one or more computation modules 206, 208, and 210 based upon the state of attack for each user identifier. The monitoring interval corresponds to a time interval for monitoring the plurality of SIP response messages for each user identifier and computing the frequency and the count of negative events, after an occurrence of a first negative event corresponding to each user identifier. The monitoring interval is dependent upon the state of the attack and the sensitivity parameter. Table 1 lists exemplary values of monitoring intervals for the three states of attacks and different values of the sensitivity parameter.

TABLE 1

| | Sensitivity parameter | | | |
|---|---|---|---|---|
| State of attack | High | Medium | Low | Minor |
| Normal | 20 sec | 15 sec | 10 sec | 5 sec |
| Suspect | 40 sec | 30 sec | 15 sec | 10 sec |
| Attack | 60 sec | 45 sec | 20 sec | 15 sec |

The timer module 214 updates the monitoring interval upon a change in the state of attack for each user identifier. For example, if for the SIP URI abc@example.com, the prediction module 212 makes a transition from the 'normal state' to the 'suspect state', the timer module 212 sets the monitoring interval for the first computation module 206 to 30 seconds, assuming that the sensitivity parameter is set to "Medium". Upon expiration of the monitoring interval, the computation module 206 is reset.

Furthermore, if the prediction module 212 indicates the 'attack state' for the at least one user identifier, the prevention module 216 initiates blocking mechanism for the at least one user identifier. The prevention module 216 inserts the at least one user identifier in a blocking list and initializes a blocking interval for the at least one user identifier. In addition, the timer module 214 adds the blocking interval to the monitoring interval for the at least one user identifier.

The prevention module 216 includes a blocking module 228 for blocking a plurality of SIP messages originated at the at least one user identifier and destined for the protected entity 106 for the duration equal to the blocking interval. The blocking module 228 may be configured to use only the IP address, or only the SIP URI, or both for blocking the plurality of SIP messages. In addition, if the plurality of SIP messages are carried over the TCP, the blocking module 228 may reset a TCP connection between a user identified by the at least one user identifier and the protected entity 106 either in an inbound direction, or in an outbound direction, or in both the inbound and the outbound directions. The prevention module 216 further includes a sender module 230. The sender module 230 sends a SIP error response message to the at least one user identified by the at least one user. The SIP error response message may be pre-defined. For example, the sender module 230 sends a SIP 603 Decline message. A person skilled in the art will recognize that the sender module 230 may also send the SIP error response message with other SIP response codes, such as, but not limited to, 4xx, 5xx, or 6xx indicating a client error, a server error or a global error, respectively.

Optionally, the prevention module 216 may be configured to function in a detection mode. In the detection mode, the prevention module 216 functions in the same manner as described above, except that the blocking module 228 does not block the one or more SIP messages. In addition, the blocking module 228 does not reset the TCP connection between the user and the protected entity 106. Moreover, the sender module 230 does not send the SIP error response message.

Figure 3:
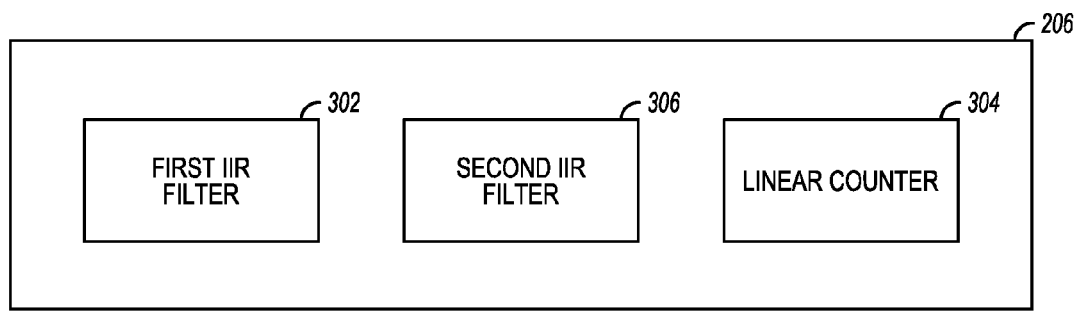
FIG. 3 illustrates implementation of a computation module, in accordance with an embodiment of the present invention.

FIG. 3 illustrates implementation of the first computation module 206, in accordance with an embodiment of the present invention. Though the implementation of only the first computation module 206 is given, a person skilled in the art will recognize that the second computation module 208 and the third computation module 210 are also implemented in a similar manner. The first computation module 206 includes a first infinite impulse response (IIR) filter 302 for statistically estimating the frequency of negative events. In an exemplary case, the first IIR filter 302 computes the frequency using following equations:

$$A\_D_i = \alpha \times A\_D_{i-1} + (1-\alpha) \times \Delta t_i, \quad \text{(Eq. 1)}$$

$$f = \frac{1}{A\_D_i}, \quad \text{(Eq. 2)}$$

where, $A\_D_i$ and $A\_D_{i-1}$ denote average time duration between two successive negative events corresponding to an occurrence of i-th and (i−1)-th negative event, respectively and f denotes the frequency of negative events. $\Delta t_i$ represents time duration between the i-th and (i−1)-th negative event. The first IIR filter 302 uses a first filter coefficient α for estimating the average time duration. In an exemplary case, the first filter coefficient α is adapted as follows:

$$\alpha = \frac{i-1}{i}, \text{ if } 1 \leq i \leq N\_Base \quad \text{(Eq. 3)}$$

$$\alpha = \exp\left(-\frac{1}{N\_Base}\right), \text{ if } i > N\_Base.$$

The first filter coefficient α is adaptive for a configurable number of steps, denoted by N_Base, whereas the first filter coefficient α is constant after the N_Base steps. Thus, the first IIR filter 302 acts as a linear averaging filter up to the N_Base steps and as an exponential averaging filter after the N_Base steps. The configurable number of steps N_Base may be interpreted as a memory of the first IIR filter 302. The configurable number of steps N_Base is determined using the membership function corresponding to the count of negative events. Determination of the configurable number of steps N_Base is described in detail in conjunction with FIG. 4. The first computation module 206 may implement a first exponential look-up table for obtaining the first filter coefficient α. Alternatively, if N_Base>>1, the first computation module 206 may compute the first filter coefficient α using a following approximation:

$$\alpha \approx 1 - \frac{1}{N\_Base}.$$

The first computation module 206 further includes either a linear counter 304, or a second IIR filter 306, or both for statistically estimating the count of negative events. An administrator may configure the first computation module 206 to statistically estimate the count of negative events using either the linear counter 304 or the second IIR filter 306. The linear counter 304 is selected if an application running on the protected entity 106 rarely generates SIP response messages including the pre-defined SIP response codes for legitimate users. Alternatively, the second IIR filter 306 is selected, if the application may frequently generate the SIP response messages including the pre-defined SIP response codes for the legitimate users.

The linear counter 304 computes the count of negative events using a following expression: $N_i = N_{i-1} + 1$, where $N_i$ and $N_{i-1}$ denote the count of negative events at an occurrence of i-th and (i−1)-th negative event, respectively. The second IIR filter 306 estimates the count of negative events as an exponential average of the count of negative events within a time window T_Base, using an expression: $N_i = \beta_i N_{i-1} + 1$, where, $\beta_i$ is a second filter coefficient. In an exemplary case, the second filter coefficient $\beta_i$ is adapted based on the following equation:

$$\beta_i = \exp\left(-\frac{\Delta t_i}{T\_Base}\right), \quad \text{(Eq. 4)}$$

where, $\Delta t_i$ represents time duration between the i-th and (i−1)-th negative event. The first computation module 206 may implement a second exponential look-up table for obtaining the second filter coefficient $\beta_i$. The first computation module 206 may use an approximated value of the second filter coefficient $\beta_i$ given by $$\beta_i \approx 1 - \frac{\Delta t_i}{T\_Base},$$

if T_Base>>$\Delta t_i$. Alternatively, the first computation module 206 may set the second filter coefficient $\beta_i$ to a constant value. The time window T_Base is computed based upon the membership functions corresponding to the frequency and the count of negative events. Computation of the time window T_Base is described in conjunction with FIG. 4.

Figure 4:
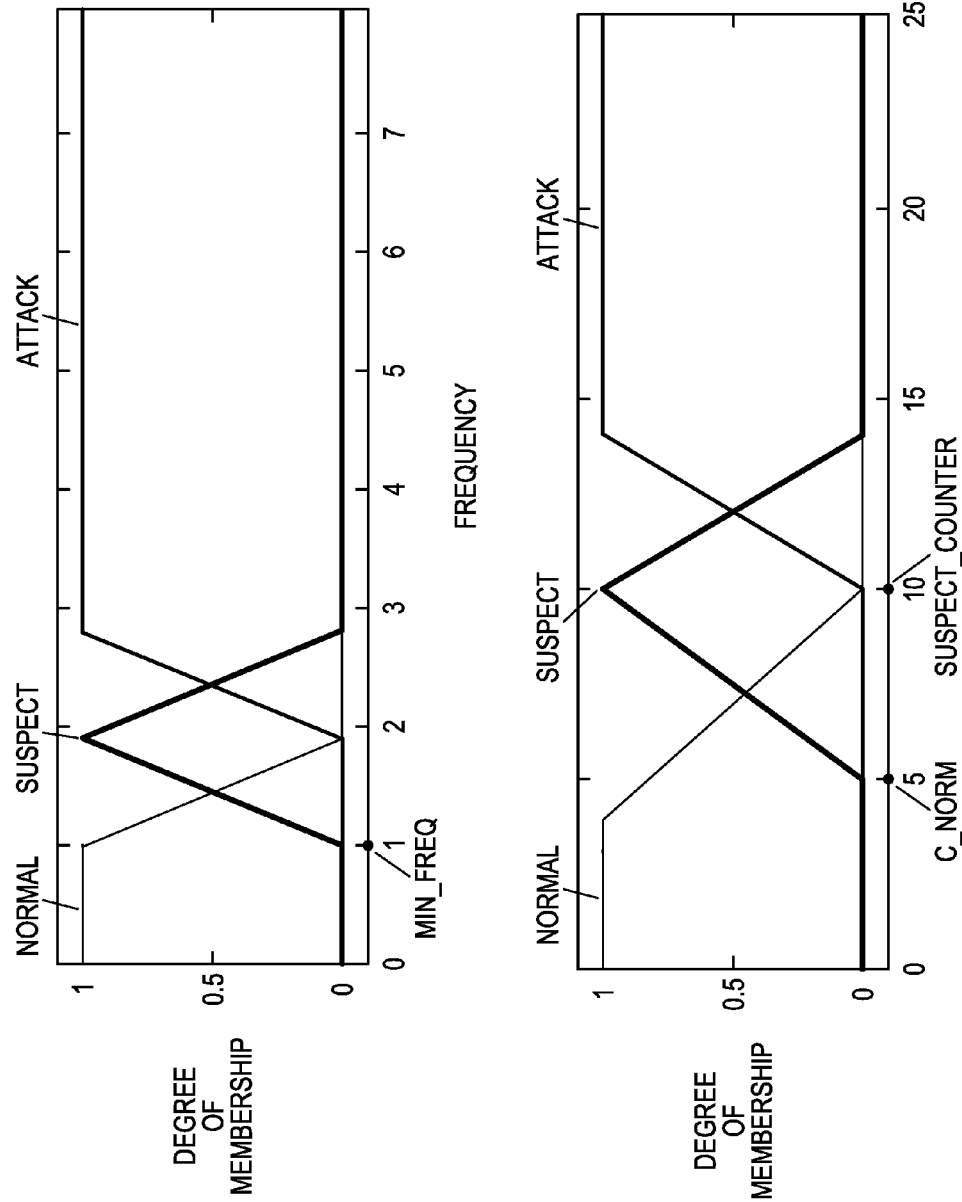
FIG. 4 illustrates computation of a configurable number of steps and a time window, in accordance with an embodiment of the present invention.

As mentioned earlier, the configurable number of steps N_Base and the time window T_Base are dependent on the membership functions for the frequency and the count of negative events. Furthermore, the first configuration number of steps N_Base and the time window T_Base also depend upon the sensitivity parameter. FIG. 4 illustrates computation of the configurable number of steps N_Base and the time window T_Base, in accordance with an embodiment of the present invention. The configurable number of steps N_Base is equal to a left corner of a 'suspect state' membership function corresponding to the count of negative events. The left corner is denoted by C_NORM and may be interpreted as a lower limit of a counter value above which an abnormal behavior may be possible. As shown in an exemplary implementation, the configurable number of steps N_Base=C_NORM=5. The time window T_Base is calculated using a following expression:

$$T\_Base = \frac{Suspect\_Counter}{MIN\_FREQ},$$

where, Suspect_Counter is a middle corner of the 'suspect state' membership function corresponding to the count of negative events and MIN−FREQ is a left corner of a 'suspect state' membership function corresponding to the frequency of negative events. The time window T_Base may be interpreted as a sufficient time interval required for a reliable estimation of the counter. An exemplary implementation of the membership functions for the frequency and the count and corresponding calculation of the time window T_Base is shown in FIG. 4.

Figure 5:
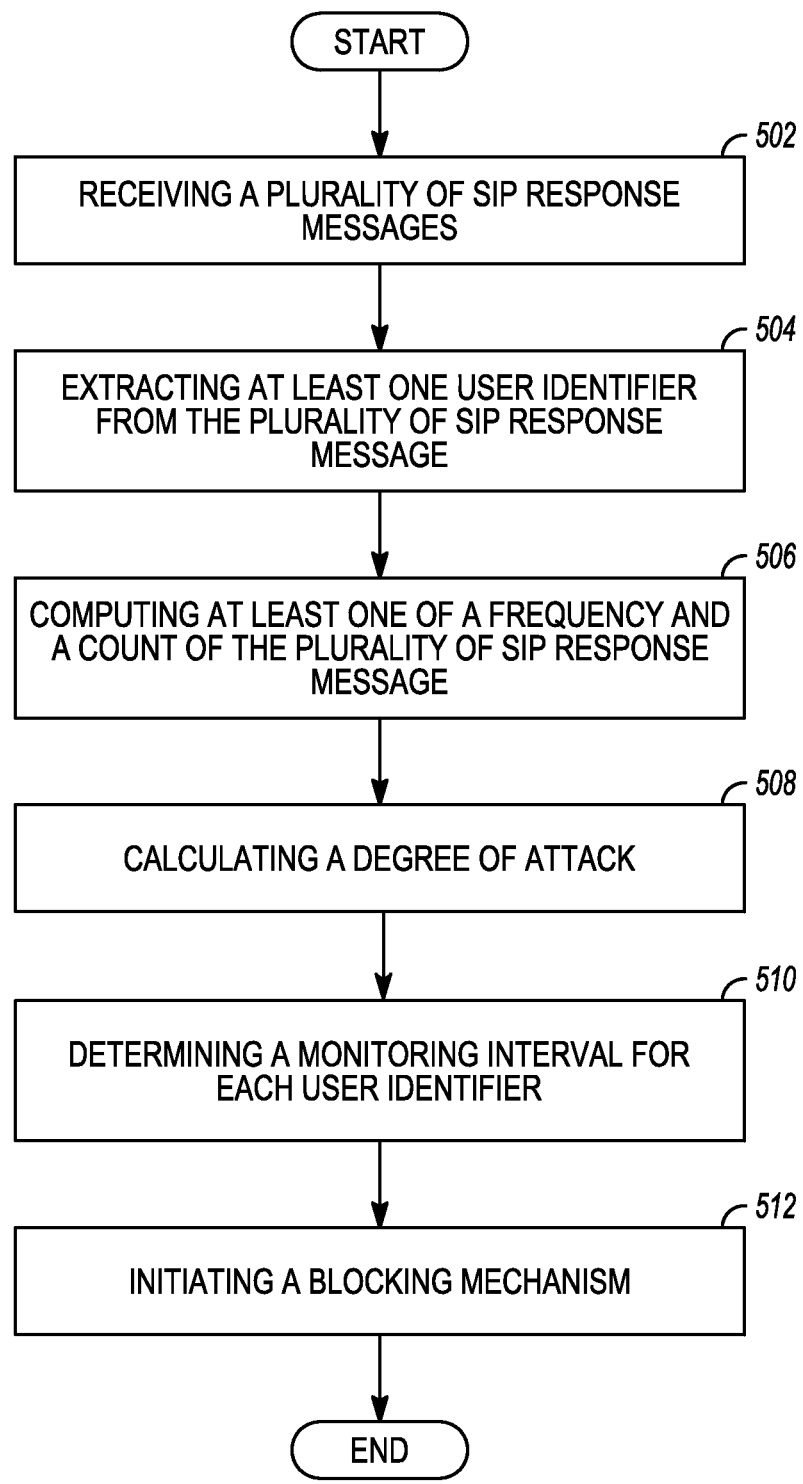
FIG. 5 is flowchart illustrating a method for preventing SIP attacks, in accordance with an embodiment of the present invention.

FIG. 5 is a flowchart illustrating a method for preventing SIP attacks, in accordance with an embodiment of the present invention. At step 502, a plurality of SIP response messages are received from the protected entity 106. The plurality of SIP response messages are filtered to determine whether the plurality of SIP response messages include at least one pre-defined SIP response code. That is, an occurrence of a negative event is detected. Upon detection of the occurrence of the negative event, at least one user identifier is extracted from the plurality of SIP response messages at step 504. The at least one user identifier includes a SIP URI, or an IP address, or both. In an exemplary case, the extractor 202 extracts the SIP URI abc@example.com and the IP address 111.222.111.222.

At step 506, a frequency of negative events and a count of negative events corresponding to each user identifier of the at least one user identifier are computed. For example, the frequency and the count of the negative events corresponding to the SIP URI abc@example.com is computed using the first computation module 206. Similarly, the second computation module 208 computes the frequency and the count for the IP address 111.222.111.222. The first computation module 206 is created, when a first negative event is detected for the SIP URI abc@example.com. For subsequent negative events corresponding to the SIP URI abc@example.com, the first computation module 206 updates the frequency and the count of negative events.

Based upon the computed frequency and the count of negative events, a degree of attack is calculated for each user identifier at step 508. In an exemplary case, the degree of attack may be calculated using the prediction module 212.

Thereafter, at step 510, a monitoring interval for each user identifier is determined depending upon the degree of attack. The degree of attack is compared with the first threshold and the second threshold. Using the comparison, the state of attack is determined for each user identifier and a corresponding monitoring interval is obtained according to the Table 1. The monitoring interval for the at least one user identifier is updated, when the state of attack for the at least one user identifier makes a transition from a first state to a second state. For example, if the state of attack corresponding to the SIP URI abc@example.com changes from the 'normal state' to the 'suspect state', corresponding monitoring interval is updated according to Table 1.

Furthermore, if the 'attack state' is predicted for the at least one user identifier, blocking mechanism is initiated at step 512. The at least one user identifier is added to the blocking list. The blocking interval, denoted by BP, for the at least one user identifier is determined. The blocking interval BP is initialized to a random value between 5 seconds and 60 seconds. Moreover, the monitoring interval for the at least one user identifier is also extended. Thereafter, one or more SIP messages from a user identified by the at least one user identifier to the protected entity are blocked for the duration equal to the blocking interval. At the end of the blocking interval, the at least one user identifier is removed from the blocking list and the associated computation module is reinitialized. That is, the frequency and the counter are reset to zero. However, the associated computation module continues to monitor the plurality of SIP response messages for the at least one user identifier for the monitoring interval. At the expiration of the monitoring interval, the 'attack state' is closed and the corresponding computation module is deleted.

If a subsequent attack is detected from the at least one user identifier during the monitoring interval, the blocking interval BP is extended using a following expression: $BP=K \times LBP$, where LBP is a previous blocking interval for the at least one user identifier and K is a random factor. In an exemplary implementation, the random factor K may be computed as: $K=A+w$, where $A=2$ and w is a random number between 0 and 1. A person skilled in the art will recognize that an alternate scheme for extending the blocking interval BP may be implemented. In an exemplary case, a maximum blocking interval $BP_{max}$ may also be defined. In this case, the blocking interval BP for the at least one user identifier is limited by a minimum of the maximum blocking interval $BP_{max}$ and the blocking interval BP. The maximum blocking interval $BP_{max}$ may be set to a value between 20 seconds and 600 seconds.

Most preferably, the principles of the present invention are implemented as a combination of hardware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that this invention may take. It is intended that the foregoing detailed description be understood as an illustration of selected forms that the invention may take and not as a limitation to the definition of the invention. It is only the following claims, including all equivalents that are intended to define the scope of this invention.

What is claimed is:

1. A method for preventing session initiation protocol (SIP) attacks, the method comprising:
   receiving, from a protected entity, a plurality of SIP response messages comprising at least one pre-defined SIP response code, wherein the pre-defined SIP response code comprises one or more SIP error response codes;
   extracting at least one user identifier from the plurality of SIP response messages;
   computing both of a frequency of the plurality of SIP response messages and a count of the plurality of SIP response messages corresponding to each user identifier of the at least one user identifier, wherein the frequency of the plurality of SIP response messages is a frequency of an occurrence of a sequence of successive SIP response messages including the one or more SIP error response codes, thereby computing the frequency of negative events for the at least one user identifier;
   calculating a degree of attack corresponding to each user identifier using the computed frequency and the count of the plurality of SIP response messages including the SIP error response codes; and
   determining a monitoring interval for each user identifier based upon the computed degree of attack for monitoring the plurality of SIP response messages.

2. The method of claim 1 wherein the user identifier comprises at least one of a SIP uniform resource identifier (URI) and an internet protocol (IP) address.

3. The method of claim 1 wherein computing comprises statistically estimating both of the frequency and the count of the plurality of SIP response messages.

4. The method of claim 3 further comprising determining at least one of a time window and a configurable number of steps for estimating both of the frequency and the count, according to a sensitivity parameter.

5. The method of claim 1 wherein calculating the degree of attack comprises calculating using one or more fuzzy membership functions corresponding to the both of the frequency and the count of the plurality of SIP response messages including the SIP error response codes, selected based upon a sensitivity parameter.

6. The method of claim 1 further comprising initiating a blocking mechanism, if the calculated degree of attack for the at least one user identifier is greater than a first predefined threshold.

7. The method of claim 6 wherein the blocking mechanism comprises determining a blocking interval for the at least one user identifier.

8. The method of claim 7 further comprising extending the blocking interval if a subsequent SIP attack from the at least one user identifier is detected.

9. The method of claim 7 further comprising blocking a plurality of SIP messages originated from the at least one user identifier in the blocking interval, wherein the plurality of SIP messages are intended for the protected entity.

10. The method of claim 6 further comprising sending a SIP error response message to at least one user identified by the at least one user identifier.

11. An apparatus for preventing session initiation protocol (SIP) attacks, the apparatus comprising:
  a receiving module for receiving, from a protected entity, a plurality of SIP response messages comprising at least one pre-defined SIP response code, wherein the pre-defined SIP response code comprises one or more SIP error response codes;
  an extractor for extracting at least one user identifier from the plurality of SIP response messages;
  one or more computation modules for computing both of a frequency of the plurality of SIP response messages and a count of the plurality of SIP response messages corresponding to each user identifier of the at least one user identifier, wherein the frequency of the plurality of SIP response messages is a frequency of an occurrence of a sequence of successive SIP response messages including the one or more SIP error response codes, thereby computing the frequency of negative events for the at least one user identifier;
  a prediction module for calculating a degree of attack corresponding to each user identifier using both of the computed frequency and the count of the plurality of SIP response messages; and
  a timer module for determining a monitoring interval for each user identifier based upon the calculated degree of attack for monitoring the plurality of SIP response messages including the SIP error response codes.

12. The apparatus of claim 11 wherein the user identifier comprises at least one of a SIP uniform resource identifier (URI) and an internet protocol (IP) address.

13. The apparatus of claim 11 wherein the receiving module comprises one or more response code filters corresponding to the at least one pre-defined SIP response code for filtering the plurality of SIP response messages.

14. The apparatus of claim 11 wherein each of the one or more computation modules comprise a statistical module for each user identifier for statistically estimating both of the frequency and the count of the plurality of SIP response messages including the SIP error response codes.

15. The apparatus of claim 14 wherein the statistical module comprises an infinite impulse response (IIR) filter.

16. The apparatus of claim 14 wherein the statistical module comprises a linear counter.

17. The apparatus of claim 11 wherein the prediction module comprises a fuzzy logic inference system for calculating the degree of attack using a fuzzy logic algorithm, wherein the fuzzy logic inference system comprises one or more membership functions corresponding to both of the frequency and the count of the plurality of SIP response messages, wherein the membership functions are selectable based on a sensitivity profile.

18. The apparatus of claim 11 further comprising a blocking module for blocking a plurality of SIP messages originating from the at least one user identifier in a blocking interval, if the calculated degree of attack for the at least one user identifier is greater than a first predefined threshold, wherein the plurality of SIP messages are intended for the protected entity.

19. The apparatus of claim 18 wherein the protected entity is a SIP server.

20. The apparatus of claim 18 wherein the protected entity is a SIP client.

21. The apparatus of claim 11 further comprising a sender module for sending a SIP error response message to at least one user identified by the at least one user identifier, if the calculated degree of attack for the at least one user identifier is greater than a first predefined threshold.

22. A computer program product comprising a non-transitory computer usable medium including a computer usable program code for preventing session initiation protocol (SIP) attacks, the computer program product comprising:
  computer usable program code for receiving, from a protected entity, a plurality of SIP response messages comprising at least one pre-defined SIP response code, wherein the pre-defined SIP response code comprises one or more SIP error response codes;
  computer usable program code for extracting at least one user identifier from the plurality of SIP response messages;
  computer usable program code for computing both of a frequency of the plurality of SIP response messages and a count of the plurality of SIP response messages, corresponding to each user identifier of the at least one user identifier, wherein the frequency of the plurality of SIP response messages is a frequency of an occurrence of a sequence of successive SIP response messages including the one or more SIP error response codes, thereby computing the frequency of negative events for the at least one user identifier;
  computer usable program code for calculating a degree of attack corresponding to each user identifier using both of the frequency and the count of the plurality of SIP response messages including the SIP error response codes; and computer usable program code for determining a monitoring interval for each user identifier based upon the degree of attack for monitoring the plurality of SIP response messages.

23. The computer program product of claim 22 further comprising a computer usable program code for statistically estimating both of the frequency and the count of the plurality of SIP response messages.

24. The computer program product of claim 22 further comprising a computer usable program code for determining at least one of a time window or a configurable number of steps for the estimating, according to a sensitivity profile.

25. The computer program product of claim 22 further comprising a computer usable program code for calculating the degree of attack using one or more fuzzy membership functions corresponding to both of the frequency and the count of the plurality of SIP response messages including the SIP error response codes, selected based upon a sensitivity parameter.

26. The computer program product of claim 22 further comprising a computer usable program code for initiating a blocking mechanism based upon the calculated degree of attack.

27. The computer program product of claim 22 further comprising a computer usable program code for determining a blocking interval for the at least one user identifier.

28. The computer program product of claim 22 further comprising a computer usable program code for extending the blocking interval.

29. The computer program product of claim 22 further comprising a computer usable program code for blocking a plurality of SIP messages originated from the at least one user identifier.

30. The computer program product of claim 22 further comprising a computer usable program code for sending a SIP error response message to at least one user identified by the at least one user identifier.

* * * * *